Nov. 27, 1956  F. G. BLAKE, JR  2,771,961
METHOD OF INITIATING UNDERWATER SEISMIC DISTURBANCES
Filed July 27, 1955

INVENTOR
FRANCIS G. BLAKE, JR.
BY
ATTORNEYS

United States Patent Office 2,771,961
Patented Nov. 27, 1956

2,771,961
METHOD OF INITIATING UNDERWATER SEISMIC DISTURBANCES

Francis G. Blake, Jr., Fullerton, Calif., assignor to California Research Corporation, San Francisco, Calif., a corporation of Delaware Application July 27, 1955, Serial No. 524,658

4 Claims. (Cl. 181—.5)

My invention relates to a method of initiating seismic disturbance in water, and particularly to a method of reducing the secondary pressure pulses resulting from bubble oscillation due to explosions below the surface.

In the conventional practice of offshore seismic surveying, a string of detectors is placed on the bottom of the ocean or slightly below the surface of the water. These detectors are connected to a multi-channel recorder in a recording boat. A charge of explosive is detonated below the surface of the water to create a seismic disturbance. The seismic disturbance passes through the water into the bottom of the ocean and strikes a reflector which may be thousands of feet below the ocean bottom. The seismic disturbance is reflected from the reflector or subterranean discontinuity back to the seismic detectors in the water. The seismic detectors pass an electrical signal to the recording boat where a number of seismic traces coming from the different detectors are recorded on a single record.

The depth at which the explosive charge is placed below the surface of the water has been found to be a critical factor in the proper recording of seismic reflections. If the explosive charge is placed too deep within the water, the explosive cavity or gas bubble from the explosion tends to pulsate. That is, the bubble expands and contracts a number of times before the energy of the explosion is completely dissipated. Seismic detectors placed in the water detect the energy which travels through the water directly to the detectors. At times, the detectors also receive a pulse of energy which is known to result from the direct flow to the detectors of energy due to pulsations of the explosive bubble. The first directly received energy from the explosion has a high amplitude and arrives at a predictable time. Accordingly, it gives rise to little or no difficulty in interpreting the seismic record. Directly received energy from subsequent pulsations of the bubble causes a lower amplitude deflection on the seismic record and may arrive simultaneously with reflected energy, or at a time such as it may be confused with reflected energy.

Each contraction of the bubble results in the radiation of a secondary pulse of seismic energy. The secondary pulses occur at a time when the reflected energy from the initial explosion is being recorded. The secondary pulses which travel directly to the detectors are larger in amplitude than the energy of the initial explosion reflected from the deep lying reflectors, and hence, obscure the desirable reflected energy arriving at the detectors. After the bubble oscillations cease, the signal received at the detectors is a composite of energy which originated at different times and was reflected from reflectors at different depths. The computation of individual bed depths becomes impossible under the circumstances.

The problem of preventing bubble oscillations has been attacked in the past by the use of a pair of explosive sources. Patent No. 2,619,186 to Carlisle employs a pair of explosive sources which are placed close enough together that their explosive bubbles overlap on the first expansion of the bubbles. It is intended that such a placement of the explosive sources will cause the two bubbles to coalesce and thereby reduce the bubble pulse. Patent No. 2,599,245 to Finn employs a main explosive source with a vertically adjacent smaller source. The two sources are placed sufficiently close that the smaller source creates a bubble which is in contact with the bubble from the larger source during the initial expansion of the two bubbles and thereby creates a channel for pressure release from the larger bubble toward the surface.

Both of these patents appear to rely on the immediate combination of the bubbles from two sources in order to prevent bubble pulses. While both of these methods may, under the proper circumstances, cause suppression of bubble pulsation, I have found that two seismic sources may be employed in a different fashion to minimize bubble pulsation. My method operates on a different physical principle and results in the dissipation of an appreciable portion of the pulsation energy before the explosive bubbles come in contact with each other. My method distinguishes from the Carlisle and Finn method in that, in the practice of my method, seismic charges are spaced apart so that the bubbles arising from the detonation of the charges do not contact each other during their first expansion. Further, I have found that the explosive sources may be separated by a vertical distance in the water if the potential energies of the explosive charges are properly related to the vertical distances between the charges.

Both patents teach that the two explosive charges may be of different magnitude but they both contemplate that the explosive bubbles from their charges coalesce during the first expansion of the bubble. I have found that the bubbles from the two explosives can be made to migrate together if the explosive charges have the proper weights relative to the vertical distance between the charges. The movement together of the bubbles dissipates the energy in the bubbles and minimizes the seismic disturbance caused by the pusating bubble.

Briefly stated, my invention involves the use of two explosive sources separated by vertical distance in the water. The distance between the sources is no smaller than the sum of the maximum radii of the explosive bubbles from the sources and is no more than 3 halves the sum of the maximum radii of the explosive bubbles. The maximum radius is defined as the radius of the bubble at the end of its first expansion. The explosive sources are placed at different depths in the water and their potential energies are given by the following relationship:

$$\frac{W_1^2}{(D_1+33)^5} = \frac{W_2^2}{(D_2+33)^5}$$

in which $W_1$=the potential energy of one of the explosive sources
$W_2$=the potential energy of the second source
$D_1$=the distance below the surface of the water of the first explosive source
$D_2$=the distance below the surface of the water of the second explosive source.

The novel features of my invention are set forth with more particularity in the accompanying claims. The invention itself however, with respect to the details thereof, together with its additional objects and advantages may be better understood from the following description of a specific embodiment with reference to the accompanying drawings in which—

Figure 1:
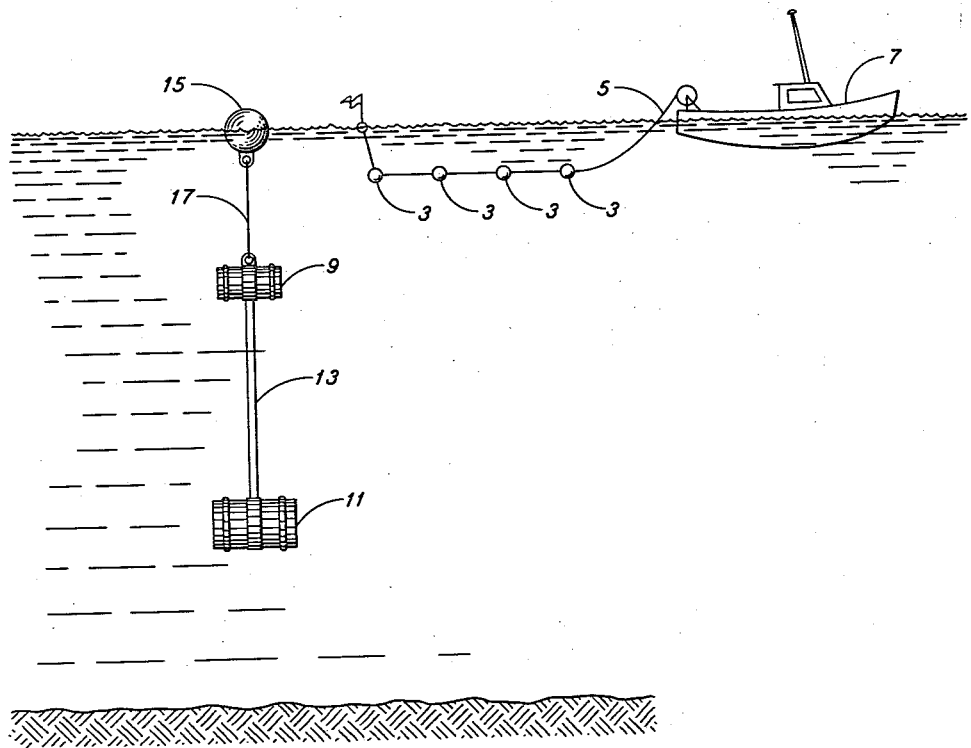
Fig. 1 shows explosives in place below the surface of the water.

As shown in Fig. 1, a group of seismic detectors 3 are placed in line in the water. A conductor 5 leads from the detectors to the recording boat 7. A pair of explosive charges 9 and 11 are spaced apart at a predetermined distance by a rod or line 13. A buoy 15 supports the explosive charges 9 and 11 from a line 17. A conductor leads from an auxiliary boat (not shown) to explosives 9 and 11. The auxiliary boat is equipped to detonate the explosives 9 and 11 simultaneously. While the drawing shows two charges centered one above the other, one of the charges may be above and to the side of the other. It is, however, contemplated that the charges will be spaced apart vertically and that the weight of explosive in the lower charge will be greater than the weight of the explosive in the upper charge.

Figure 2:
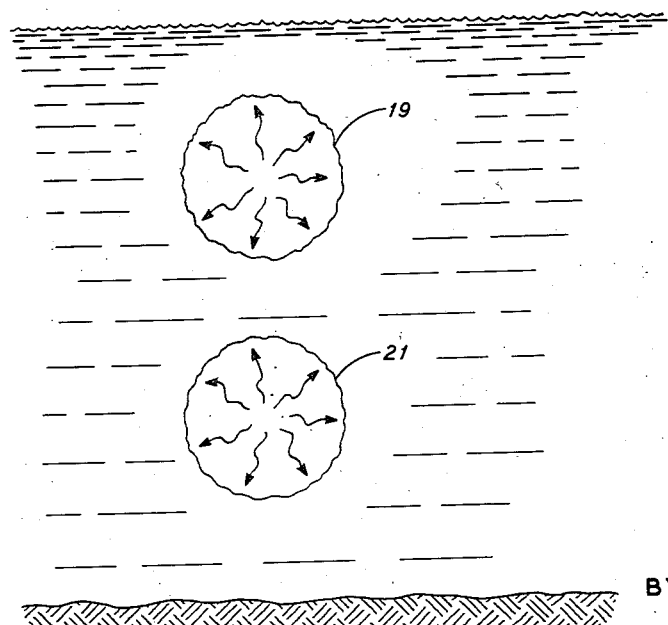
Fig. 2 shows the bubbles caused by the two explosives.

Fig. 2 shows the explosive bubbles formed in the water as seen shortly after the charges 9 and 11 are detonated. The bubble 19 arising from the charge 9 and bubble 21 arising from the detonation charge 11 are not in contact during the first expansion of the explosive bubbles 19 and 21. In the practice of my invention the charges 9 and 11 are spaced apart by a distance less than 3 halves the sum of the maximum radii of explosive bubbles 19 and 21. The minimum separation between the explosive charges 9 and 11 is that which will prevent the explosive bubbles 19 and 21 from coalescing during their first expansion.

The following approximate formula gives the maximum radius of an explosive bubble in sea water:

$$a_m = 13.5 \left(\frac{W}{d+33}\right)^{1/3}$$

$a_m$ = maximum radius in feet
$W$ = weight of explosive in pounds
$d$ = depth of submergence in feet This formula applies where the explosive is black powder or T. N. T. It is substantially correct for dynamite, tetryl and pentolite. If another explosive is used which has different explosive characteristics, this will be reflected in a constant in the formula, which will in that case differ from 13.5.

I have prepared a table setting forth maximum radii of the bubbles for black powder or dynamite. The weight W of explosive is placed at a depth $d$ and causes an explosive bubble which reaches a maximum radius $a_m$ feet at the end of the first expansion.

| $d$ (ft.) | $W$ (lbs.) | $a_m$ (ft.) |
|---|---|---|
| 20 | 45 | 12.7 |
| 30 | 45 | 12.1 |
| 40 | 45 | 11.5 |
| 50 | 45 | 11.1 |
| 75 | 45 | 10 |
| 100 | 45 | 9.5 |
| 150 | 45 | 8.5 |
| 200 | 45 | 7.7 |
| 20 | 20 | 9.7 |
| 30 | 20 | 9.2 |
| 40 | 20 | 8.8 |
| 50 | 20 | 8.4 |
| 75 | 20 | 7.7 |
| 100 | 20 | 7.2 |
| 150 | 20 | 6.5 |
| 200 | 20 | 5.9 |
| 20 | 10 | 7.7 |
| 30 | 10 | 7.3 |
| 40 | 10 | 7.0 |
| 50 | 10 | 6.6 |
| 75 | 10 | 6.1 |
| 100 | 10 | 5.7 |
| 150 | 10 | 5.1 |
| 200 | 10 | 4.7 |

The potential energy of the two sources will be determined according to the following relationship:

$$\frac{W_1^2}{(D_1+33)^5} = \frac{W_2^2}{(D_2+33)^5} \quad (1)$$

in which $W_1$ = the potential energy of the first explosive source
$W_2$ = the potential energy of the second source
$D_1$ = the distance below the surface of the water of the first explosive source
$D_2$ = the distance below the surface of the water of the second explosive source.

Hence, the depth of $D_2$ can be determined in accordance with the relationship:

$$D_2 = \left(\frac{W_2}{W_1}\right)^{2/5}(D_1+33) - 33 \quad (2)$$

A value may be first selected for the weights of the two explosives and the depth of one of the explosive below the surface. The potential energy of a charge is approximately proportional to the weights of the charges and $W_1$ and $W_2$ may be the weight of explosive in the charges. From the above equation the depth of the second explosive can be determined. The foregoing table relating maximum radii to depth and weight of explosive is used to select values for use in the equation which will satisfy the requirement that the charges have the proper spacing apart. It is to be noted that the requirement may be used:

$$1 \leq \frac{L}{a_{m_1}+a_{m_2}} \leq 3/2 \quad (3)$$

where $L$ = the distance between the centers of the explosive sources
$a_{m_1}$ = maximum radius of the explosive bubble from the first charge
$a_{m_2}$ = maximum radius of the explosive bubble from the second charge.

Equations 2 and 3, solved together, have an infinite number of solutions. The seismic prospector is required merely to select convenient values for three of the variables in view of Equation 3 and determine the fourth value from Equation 2. The explosive charges are preferably spaced apart at a distance greater than the sum of the maximum radii of the two explosive bubbles but less than 3 halves the sum of the maximum radii. It is important that the energies of the explosives and their depth below the surface be related according to the above equations. The explosives are placed far enough apart that their explosive bubbles do not contact on the first expansion; instead, the explosive bubbles move toward each other as they oscillate. I have used the quantities $(D_1+33)^5$ and $(D_2+33)^5$ in the above equations. In the equations the exponent 5 may range from 4.5 to 5.5. For example I have found that the exponent 5.32 is the best value as shown by one series of experiments.

The effectiveness of my invention probably arises from the phenomenon that bubbles from the two charges migrate toward each other after the initial explosion. Bjerknes forces exist to draw together two pulsating spheres in a liquid which oscillate in phase (cf. "Bjerknes forces in stationary sound fields," F. G. Blake, The Journal of the Acoustical Society of America, vol. 21, No. 5, p. 551, September 1949). The two bubbles from the explosion of the charges according to my invention, are attracted together by Bjerknes forces. Migration of the two bubbles results in viscous dissipation of the energy of oscillation and in conversion of the energy of oscillation into energy of translation of the surrounding water. As a result of this dissipation of the energy of oscillation, there is less energy radiated in the form of secondary pressure pulses and less noise is generated in the seismic detectors.

While I have explained my invention with reference to a single embodiment, I am aware that many modifications of it may be made within the scope of my invention. For example, it is not essential that the two explosives lie in the same vertical line, it is merely necessary that one explosive be at a greater depth than the other. I do not, therefore, intend to limit my invention except as set forth in the appended claims.

I claim:

1. A seismic source for offshore seismic exploration comprising a first and second explosive source, means for positioning said first explosive source above said second explosive source, means for detonating said explosive sources simultaneously, the potential energy of said explosive sources being related to their positions in the water according to the following relationship:

$$\frac{W_1^2}{(D_1+33)^5} = \frac{W_2^2}{(D_2+33)^5}$$

where $W_1$ = the potential energy of the first explosive source
$W_2$ = the potential energy of the second explosive source
$D_1$ = depth below the surface of the first explosive source
$D_2$ = depth below the source of the second explosive source, said first and second explosive sources being spaced apart by a distance greater than the sum of the maximum radii of the two explosive bubbles and within the range of Bjerknes forces.

2. A seismic source for offshore seismic exploration comprising a first and second explosive source, means for positioning said first explosive source above said second explosive source, means for detonating said explosive sources simultaneously, the weight of the explosive in said explosive sources being related to their positions in the water according to the following relationship:

$$\frac{W_1^2}{(D_1+33)^5} = \frac{W_2^2}{(D_2+33)^5}$$

where $W_1$ = the weight of explosive charge of the first explosive source
$W_2$ = the weight of explosive charge of the second explosive source
$D_1$ = depth below the surface of the first explosive source
$D_2$ = depth below the surfacve of the second explosive source, said first and second explosive sources being spaced apart by a distance greater than the sum of the maximum radii of the explosive bubbles and less than 3 halves the sum of the maximum radii of the explosive bubbles.

3. The method of producing an underwater seismic impulse comprising placing a first charge of explosive of a preselected potential energy within the water at a depth $D_1$ below the surface thereof, placing a second charge of explosive of preselected potential energy within the water at a depth $D_2$ below the surface thereof and in vertical spaced relationship to said first charge the depth of each charge and its respective potential energy being related substantially in accordance with the relationships $$\frac{W_1^2}{(D_1+33)^5} = \frac{W_2^2}{(D_2+33)^5}$$

in which $W_1$ = the potential energy of the first charge
$W_2$ = the potential energy of the second charge
$D_1$ = the distance below the surface of the water of the first explosive source
$D_2$ = the distance below the surface of the water of the second explosive source, said first and second charges of explosive being spaced apart at a distance greater than the sum of the maximum radii of the two explosive bubbles and within the range of Bjerknes forces, and exploding the charges simultaneously to produce said seismic impulse.

4. The method of producing an underwater seismic impulse comprising placing a first charge of explosive of a preselected potential energy within the water at a depth $D_1$ below the surface thereof, placing a second charge of explosive of preselected potential energy within the water at a depth $D_2$ below the surface thereof and in vertical spaced relationship to said first charge, the depth of each charge and its respective potential energy being related substantially in accordance with the relationships $$D_1 = \left(\frac{W_1}{W_2}\right)^{2/5}(D_2+33) - 33$$

where $W_1$ = the potential energy of the first charge
$W_2$ = the potential energy of the second charge
$D_1$ = the distance below the surface of the water of the first explosive source
$D_2$ = the distance below the surface of the water of the second explosive source, said first and second charges of explosive being spaced apart by a distance greater than the sum of the maximum radii of their explosive bubbles and less than three halves the sum of the maximum radii of their explosive bubbles, and exploding the charges simultaneously to produce said seismic impulse.

References Cited in the file of this patent

UNITED STATES PATENTS

| 2,599,245 | Finn | June 3, 1952 |
| 2,619,186 | Carlisle | Nov. 25, 1952 |